(No Model.)
F. SCHNEIDER.
MEASURE AND WEIGHER COMBINED.
No. 281,567. Patented July 17, 1883.
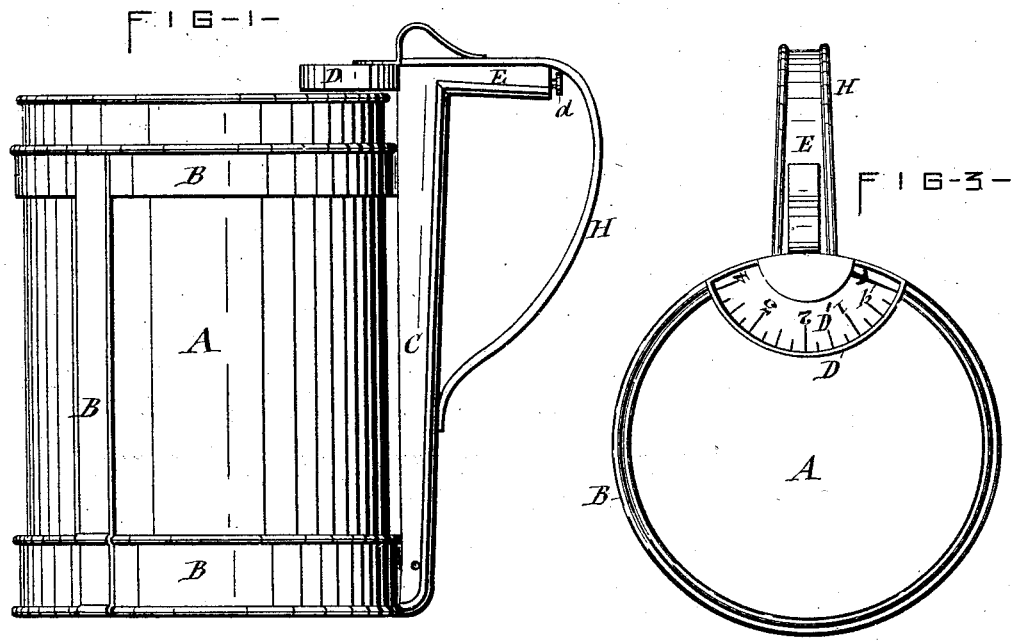
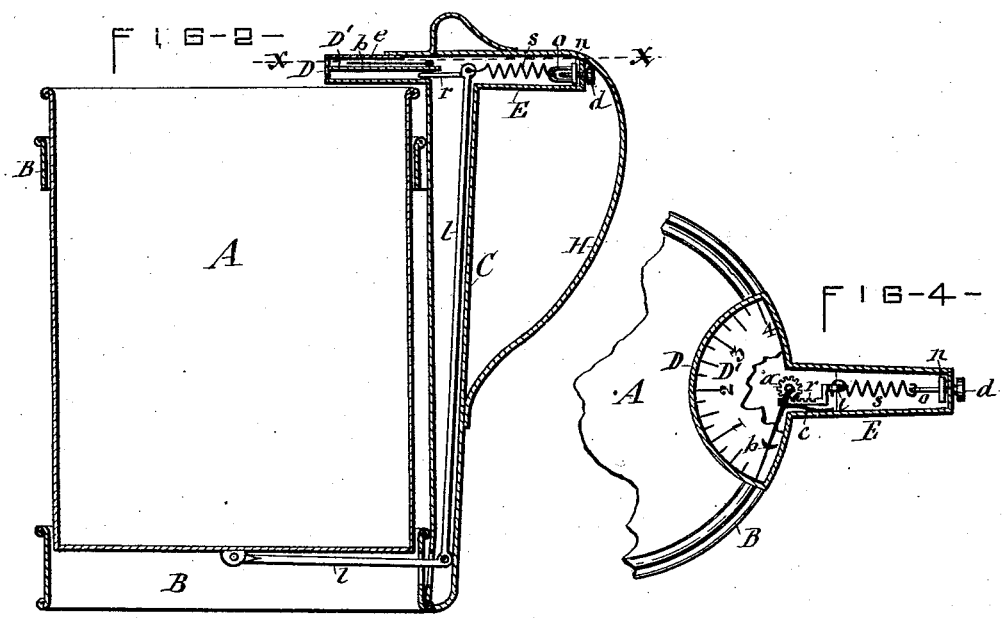

UNITED STATES PATENT OFFICE.

FRANK SCHNEIDER, OF SYRACUSE, NEW YORK.

MEASURE AND WEIGHER COMBINED.

SPECIFICATION forming part of Letters Patent No. 281,567, dated July 17, 1883.

Application filed April 30, 1883. (No model.)

*To all whom it may concern:*

Be it known that I, FRANK SCHNEIDER, of Syracuse, in the county of Onondaga, in the State of New York, have invented new and useful Improvements in Measure and Weigher Combined, of which the following, taken in connection with the accompanying drawings, is a full, clear, and exact description.

This invention relates to the class of liquid-measures which are arranged movably in a suitable holder and mounted on a spring-support connected with said holder, the latter being provided with a graduated scale for showing the movement of said spring-support and thereby indicating the weight of the contents of the measure.

The invention is fully illustrated in the annexed drawings, wherein Figure 1 is an exterior side view of the combined liquid measure and weigher. Fig. 2 is a vertical section thereof. Fig. 3 is a top view of the same, and Fig. 4 is a horizontal section on line $x$ $x$ in Fig. 2, with a portion of the scale-plate broken away to illustrate the actuating mechanism of the indicator or pointer.

Similar letters of reference indicate corresponding parts.

A represents a receptacle for the liquid to be measured or weighed.

B is a holder for the said receptacle, and it consists of a frame loosely embracing the receptacle, and provided with a suitable handle, H. Said frame is formed with a vertical tube, C, which is joined with a horizontal tube, E, at the top of the frame. Within the tube C, at the base thereof, is pivoted a bell-crank lever, $l$, the lower or horizontal arm of which is extended under the bottom of the receptacle A and supports the latter. The vertical arm of the lever $l$ is extended to the top of the tube C, where it has connected to it a spring, $s$, which is arranged in the horizontal tube E, and has its opposite end connected to a yoke, $o$, fixed to a nut, $n$. A set-screw, $d$, inserted through the end of the tube E and working the nut $n$, completes the connection of the spring. By means of said set-screw more or less tension can be imparted to the spring, and thus the power of the lever for resisting the weight of the receptacle A can be adjusted, as may be required. To the upper end of the lever $l$ is also connected a rack, $r$, which engages a pinion, $a$, pivoted to a case, D, which projects from the upper end of the tube C over the top edge of the receptacle A, as shown. The case D has an intermediate plate D', between which and the bottom of the case the pinion $a$ is located. The axle of said pinion is fixed thereto and protrudes through the plate D', and has secured to its protruding end an indicator or pointer, $b$. The top of the plate D' is marked with a semicircular or segmental graduated scale, by which to determine the degree of movement of the indicator $b$. The top of the case D consists of a glass plate, $e$, to expose to view the scale and indicator. Said case is made perfectly tight to protect the scale, indicator, and actuating mechanism of the latter.

The operation of my invention is as follows: When the liquid to be measured has to be drawn from the barrel, the operator can hold the receptacle A under the faucet by means of the handle H; or he can set it down under the faucet, the holder B extending sufficiently below the bottom of the receptacle to afford the necessary play to the lever $l$. As the liquid enters the receptacle the weight thereof depresses the lower arm of the lever $l$, and thereby swings the upper end of said lever toward the receptacle. In this latter movement the rack $r$ turns the pinion $a$, which carries with it the pointer $b$, the scale D showing the degree of movement of said pointer, and being graduated into pint and quart marks, so arranged that the pointer will coincide with a mark when the receptacle A contains the requisite weight of liquid to make the quantity represented by said mark.

Having described my invention, what I claim is—

1. In combination with the receptacle A, the frame B, provided with the tubes C E, the lever $l$, provided with the rack $r$, the scale D', pinion $a$, indicator $b$, and spring $s$, substantially as described and shown.

2. In combination with the measure A, the frame B, provided with tubes C E, lever $l$, provided with the rack $r$, scale D', pinion $a$, indicator $b$, the case D, inclosing the scale, indicator, pinion, and rack, and the spring s, arranged in the tube E, all substantially as shown and described.

3. In combination with the measure A, lever l, rack r, pinion a, indicator b, and spring s, arranged to operate as shown, the adjusting-screw d, for regulating the tension of the spring, substantially as set forth.

In testimony whereof I have hereunto signed my name and affixed my seal, in the presence of two attesting witnesses, at Syracuse, in the county of Onondaga, in the State of New York, this 18th day of April, 1883.

FRANK SCHNEIDER. [L. S.]

Witnesses:
F. H. GIBBS,
WM. C. RAYMOND.